3,402,961
Patented Sept. 24, 1968

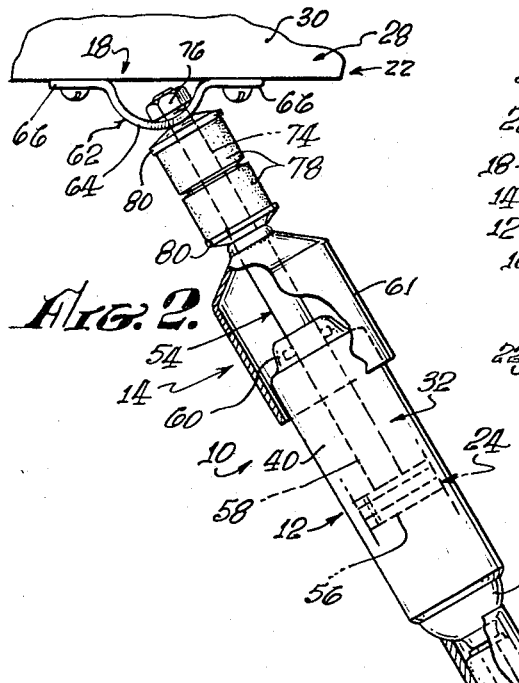

3,402,961
COMBINATION STABILIZING AND SHOCK ABSORBING DEVICE FOR CAMPER VEHICLES
Loren V. Larson, 18823 Groverdale,
Covina, Calif. 91722
Filed Dec. 7, 1967, Ser. No. 688,841
7 Claims. (Cl. 296—23)

ABSTRACT OF THE DISCLOSURE

A combination stabilizing and shock absorbing device for a camper vehicle including a camper body supported of the rear cargo section of a pickup truck and having a forward cantilevered extension projecting over the cab truck, the stabilizing device having a telescoping energy absorbing strut with quick release end couplings for connecting the struts between the body extension and the truck body in such a way that the strut is effective to eliminate sway and bounce of the camper relative to the truck.

Background of the invention

*Field of the invention.*—This invention relates generally to camper vehicles and, more particularly, to a combination stabilizing and shock absorbing device for vehicles of this class wherein the camper body has a forward cantilevered extension projecting forwardly over the driver's cab of the camper supporting truck.

*Prior art.*—Camper vehicles of the class to which this invention pertains are currently in wide spread use in ever increasing numbers and are superior in several respects to conventional travel trailers. Camper vehicles, for example, are characterized by greater maneuverability, driving ease, and highway safety, and may be driven at substantially higher speeds than travel trailers. Camper vehicles, of course, have somewhat limited usable living space. In an effort to maximize this space, most present day camper bodies are provided with a forward, cantilevered extension which projects over the driver's cab of the pickup truck on which the camper body is mounted. This extension normally provides a sleeping compartment.

Camper vehicles, of course, possess certain disadvantages. One of the major disadvantages of such vehicles, for example, resides in the fact that the camper body is subject to substantial vibration during motion of the camper vehicle, particularly at relatively high speeds. Another disadvantage of campers is that during cornering, the camper body tends to lean laterally of and produce lateral sway of the vehicle.

Camper stabilizing devices have been devised to alleviate this problem. Such devices typically comprise struts which are connected between the cantilevered extension of the camper body and underlying portions of the hood or front fenders of the camper supporting pickup truck. These struts serve to resist both vertical and lateral relative movement of the camper body relative to the truck and, thereby, to minimize vibration of the camper body and lateral sway of the camper vehicle. In some cases, the stabilizing struts have a telescoping action and embody energy absorbing means, such as a dash pot, for damping vibrations of the camper body and cushioning the shock load which such vibrations tend to create. One such combination stabilizing and shock absorbing device for example, is disclosed in prior art Patent No. 3,347,590.

Summary of the invention

The present invention provides an improved camper stabilizing and shock absorbing device of the character described. This improved device is characterized by unique end fittings for couplings on the stabilizing strut for releasably securing the latter to the camper body and its supporting pickup truck. One feature of the invention, for example, resides in the fact that the end couplings embody a quick release action which permits rapid removal and reattachment of the strut from and reattachment of the strut to the camper vehicle. This facilitates initial installation of the stabilizing device on a camper vehicle as well as subsequent removal and replacement of the camper body from its supporting truck, when desired. Another feature of the stabilizer coupling is that they possess a hinging or swivel action which permits installation of the device on a wide variety of camper vehicle configurations, minimizes undesirable stresses in the device, and further simplifies initial installation of the device.

Brief description of the drawings

FIGURE 1 is a fragmentary front elevation of a camper vehicle equipped with a pair of the present camper stabilizing and shock absorbing devices;

FIGURE 2 is an enlarged fragmentary side elevation partly in section, of one of the devices;

FIGURE 3 is a fragmentary perspective view of the lower end of the device illustrating, in particular, a quick release swivel coupling embodied in the device; and FIGURE 4 is an enlarged perspective view of an upper mounting bracket of the device.

Description of the preferred embodiment

Referring now to these drawings, there is illustrated an improved camper stabilizing device 10 according to the invention. This device includes a connecting strut 12 having upper and lower telescoping sections 14 and 16 and upper and lower end fittings or couplings 18 and 20 for attaching the strut to a camper vehicle 22. Embodied in the connecting strut 12 are energy absorbing means 24 for yieldably resisting relative longitudinal movement of the tubular sections 14 and 16.

The illustrated camper vehicle 22 is typical of vehicles of this class and thus need not be described in detail. Suffice it to say that the vehicle includes a pickup truck 24 having a forward driver's cab 26 and a rear cargo section (not shown). Mounted on this rear cargo section is a camper body 28. Camper body 28 has a forward cantilevered extension 30 which projects forwardly over the cab 26 and provides a sleeping compartment, or the like. According to the present invention, a pair of the combination stabilizing and shock absorbing devices 10 are connected between the camper body extension 30 and the underlying body portion of the pickup truck 24. Typically, these struts are attached to the hood or the front fenders of the truck. The present camper stabilizing devices 10, like the prior art stabilizing devices of this type, serve to resist and damp both vibration and lateral sway of the camper body relative to the pickup truck.

Referring now in greater detail to the drawings, the lower tubular section 16 of the connecting strut 12 includes an upper cylinder member 32, an adjacent outer sleeve 34, an inner sleeve 36, and a lower socket member 38. The upper cylinder member 32 has an upper cylinder 40, proper, and a lower relatively slender, threaded shank 42 mounting a resilient coupling sleeve 44 and a compression nut 46. The juncture of the cylinder 40 and the threaded shank 42 provides a generally spherically curved shoulder 48. The cylinder member 34 and outer sleeve 36 are joined by axially inserting the cylinder shank 42, together with its coupling sleeve 44 and compression nut 46, into the upper end of the sleeve to a position wherein this sleeve end abuts the cylinder shoulder 48. Compression nut 46 is then tightened or threaded against the coupling sleeve 44 by inserting a socket wrench or the like through the lower end of the outer sleeve. The coupling sleeve is thereby compressed axially. This axial compression of the coupling sleeve distends the sleeve radially into firm frictional locking engagement with the outer sleeve, thereby to firmly join the latter sleeve and cylinder member 32. The upper end of the inner sleeve 36 fits slidably within the lower end of the outer sleeve 34. A lock nut 50 is threaded on the lower end of the outer sleeve for radially constricting a tapered lock ring 52 into frictional locking engagement with the inner sleeve, thus to secure the sleeve against relative axial movement. It will be evident that the sleeves may be relatively longitudinally adjusted, to vary the overall length of the connecting strut 12, by loosening the lock nut 50.

The upper tubular member 14 comprises a plunger 54 including a piston 56 which slides within the cylinder 40. Coaxially secured to the piston 56 is a piston rod 58. This piston rod extends slidably through and is sealed to an upper end closure 60 of the cylinder. The cylinder 40 and plunger 54 together constitute a dash pot which forms the energy absorbing means 24. Fixed to the upper extending end of the piston rod 58 is a skirt 62 which fits loosely over the upper end of the cylinder 40.

It will now be understood, therefore, that the connecting strut 12 is a telescoping strut embodying the energy absorbing means 24 for yieldably resisting relative longitudinal movement of the tubular struts sections 14 and 16.

The structure thus far described of the combination stabilizing and shock absorbing device 10 is conventional. The present invention is concerned primarily with the end fittings or couplings 18, 20 for attaching the device to the camper vehicle 22. Referring particularly to FIGURES 2 and 4, it will be observed that the upper coupling 18 comprises a mounting bracket 62 including a curved central section 64 terminating in outwardly directed seating flanges 66. These flanges have holes 68 to receive bolts, rivets, or the like for attaching the bracket to the under side of the cantilevered camper body extension 30. Extending longitudinally of the curved bracket section 64 is a slot 70 having an enlarged entrance opening 72 at one end. The upper coupling 18 further comprises a threaded stem 74 on the upper tubular strut section 14. In this instance, the threaded stem 74 comprises an end portion of the dash pot piston rod 54. Threaded on the upper end of the stem 74 is a nut 76. Surrounding the stem 74 between this nut and the skirt 62 of the upper tubular section 14 are a pair of resilient cushioning sleeves 78 and washers 80 at the ends of the sleeve.

According to the present invention, the entrance opening 72 to the mounting bracket slot 70 is dimensioned to pass the coupling nut 76 in the axial direction of the coupling stem 74. The bracket slot 70, on the other hand, has a width just slightly greater than the diameter of the stem and less than the major transverse dimension of the nut. As a result, the connecting strut 12 may be secured to the mounting bracket 62 by axially inserting the coupling stem 74 and its coupling nut 76 through the slot entrance opening 72 in the mounting bracket and then moving the stem axially into the slot. The coupling nut 76 may then be tightened to firmly clamp the bracket between the nut and the upper washer 80. Obviously, the connecting strut may be released from the mounting bracket by reversing this procedure.

The lower strut coupling 20 comprises a mounting bracket 82. This mounting bracket, like the upper mounting bracket 62, has a generally U-shape and includes a connecting plate 84 with side flanges 86 which depend from the opposite longitudinal edges of the plate and terminate in outwardly directed seating flanges 88. These seating flanges are provided with hulls 90 to receive rivets, bolts, or the like for securing the bracket to a front fender or the hood of the camper supporting pickup truck 24. Extending longitudinally of the bracket plate 84 is a slot 94. One end of this slot opens through an end edge of the bracket plate 84 to provide an entrance opening to this slot. In addition to the mounting bracket 82, the lower strut coupling 20 comprises a threaded stem 96 on the lower end of the lower tubular strut section 16. The upper end of this stem is threaded in a ball 98. A pin 100 extends through the ball and stem to secure these parts against relative rotation. The outer end of the pin is flush with the outer surface of the ball. Ball 98 is swivelly captured within a generally spherical socket 102 on the lower socket member 38 of the connecting strut 12. It will be understood, therefore, that the ball 98 and socket 102 provide a universal swivel connection between the stem 96 and the lower tubular strut section 16. Contained within the lower socket member 38, and seating against the ball 98, is a compression spring 104. The upper cushioning sleeves 78 and the lower spring 104 eliminate endwise play in the couplings and, in addition, provide a shock absorbing action. Threaded on the lower coupling stem 96 are a pair of nuts 106.

The slot 94 in the lower mounting bracket 82 has a width slightly greater than the diameter of the lower coupling stem 96 but less than the major transverse dimension of the coupling nuts 106. The connecting strut 12 is secured to the bracket 82 by laterally moving the lower coupling stem 96 into the bracket slot 94 and then threading the coupling nuts 106 toward one another to firmly clamp the bracket plate 84 between these nuts. The connecting strut may obviously be detached from the bracket by reversing this procedure.

As noted earlier and illustrated in FIGURE 1, a pair of the present stabilizing and shock absorbing devices 12 are mounted on the camper vehicle 22 in such a way that their connecting struts 12 extend between the lower front corners of the camper body extension 30 and the underlying front fender or hood portions of the camper supporting pickup truck 24. This is accomplished by separating the mounting brackets 62, 82 from the connecting struts 12 of the devices and attaching the brackets to the camper vehicle. In this regard, it will be observed that the upper mounting brackets 62 are attached to the under surface of the camper body extension, adjacent the lower front corners of this extension. The lower mounting brackets 82 are secured to the front fenders or hood of the pickup truck 24 in such a way that the lower brackets are located somewhat forwardly and inwardly of the upper brackets. Connecting struts 12 are then attached to their respective mounting brackets, in the manner explained earlier. In this regard, it will be evident from the earlier description and from the drawings that the connecting struts may be quickly and easily secured to their respective mounting brackets by inserting the strut coupling stems 74, 96 into the corresponding bracket slots 70, 94 and then tightening the coupling nuts 76, 106 to firmly clamp the stems to the mounting brackets. When thus installed, the present stabilizing and shock absorbing devices 10 obviously resist relative movement of the camper body 28 relative to its supporting pickup truck 24, thus to inhibit lateral sway of the vehicle during cornering. In addition, the stabilizing devices resist and damp vibration of the camper body and, in addition, cushion the shock loads which tend to be created by such vibration.

One important feature of the present shock absorbing and stabilizing devices resides in the fact that the connecting struts 12 of these devices may be rapidly removed from and just as rapidly installed on the camper vehicle 22, thus to facilitate removal and replacement of the camper body 28, when desired. Another important feature of the invention resides in the angular or pivotal strut adjustment permitted by the upper strut coupling 18 and the universal swivel action embodied in the lower strut coupling 20. This adjustment and swivel action facilitate installation of the present stabilizing and shock absorbing devices on a wide variety of camper vehicles without creating undesirable stresses in the devices. Moreover, these strut couplings permit limited relative movement of the connecting struts 12 and their mounting brackets 62, 82 to further eliminate undesirable stress in the devices.

Clearly, therefore, the invention herein described and illustrated is fully capable of attaining the several objects and advantages preliminarily set forth.

While the invention has been disclosed in what is presently conceived to be its most practical and preferred embodiment, various modifications are possible within the spirit and scope of the following claims.

The inventor claims:

1. For use on a camper vehicle including a camper body supported on the rear cargo section of a pickup truck and having a forward cantilevered section projecting over the cab of said truck, a combination shock absorbing and stabilizing device to be connected between said cantilevered body section and the truck body, comprising:

a connecting strut including normally upper and lower telescoping tubular sections and energy absorbing means acting between said tubular sections for yieldably resisting relative longitudinal movement of said tubular sections, upper coupling means on the upper end of said upper tubular section for attaching said upper section to said cantilevered camper body section, lower coupling means on the lower end of said lower tubular section for attaching said lower section to said truck body, each of said couplings comprising a threaded stem on the corresponding tubular section, thrust shoulder surrounding said stem, a nut threaded on said stem, a mounting bracket having a slot receiving said stem between said shoulder and nut, whereby said nut may be threaded toward said shoulder to clamp said strut to said bracket, and an entrance opening to said slot through which said stem may be removed from and reinserted into said slot without removal of said nut from said stem, and means for securing said bracket to said camper vehicle in such a way as to permit separation of said strut from and reattachment of said strut to said mounting brackets while the latter remain attached to said vehicle, thus to accommodate rapid removal of said strut from and reinstallation of said strut on said vehicle, one of said couplings further comprising a socket secured to the corresponding tubular section, and a ball secured to the corresponding threaded stem and swivelly caged in said socket to provide a swivel connection between the latter stem and section.

2. A device according to claim 1 wherein:

said latter stem is threaded in said ball, and a pin extending through said ball and stem for securing the latter stem and ball against relative rotation.

3. For use on a camper vehicle including a camper body supported on the rear cargo section of a pickup truck and having a forward cantilevered section projecting over the cab of said truck, a combination shock absorbing and stabilizing device to the connected between said cantilevered body section and the truck body, comprising:

a connecting strut including normally upper and lower telescoping tubular sections and energy absorbing means acting between said tubular sections for yieldably resisting relative longitudinal movement of said tubular sections, upper coupling means on the upper end of said upper tubular section for attaching said upper section to said cantilevered camper body section, lower coupling means on the lower end of said lower tubular section for attaching said lower section to said truck body, each of said couplings comprising a threaded stem on the corresponding tubular section, a thrust shoulder surrounding said stem, a nut threaded on said stem, a mounting bracket having a slot receiving said stem btween said shoulder and nut, whereby said nut may be threaded toward said shoulder to clamp said strut to said bracket, and an entrance opening to said slot through which said stem may be removed from and reinserted into said slot without removal of said nut from said stem, and means for securing said bracket to said camper vehicle in such a way as to permit separation of said strut from and reattachment of said strut to said mounting brackets while the latter remain attached to said vehicle, thus to accommodate rapid removal of said strut from and reinstallation of said strut on said vehicle, one coupling having a generally U-shape in transverse cross-section and including a cross plate bounded along two opposite longitudinal edges by depending side flanges terminating in outwardly directed seating flanges for seating against a surface of said vehicle, whereby said cross plate is spaced from said surface, the stem receiving slot in said latter bracket being formed in said cross plate and extending parallel to said longitudinal plate edges and through a remaining edge of said plate to provide said latter slot with an open end which forms said entrance opening through which the corresponding coupling stem may be laterally inserted into and removed from the slot, and said one coupling further comprising a socket secured to the corresponding tubular section, and a ball secured to the corresponding coupling stem and swivelly caged in said socket to provide a swivel connection between the latter stem and section.

4. For use on a camper vehicle including a camper body supported on the rear cargo section of a pickup truck and having a forward cantilevered section projecting over the cab of said truck, a combination shock absorbing and stabilizing device to be connected between said cantilevered body section and the truck body, comprising:

a connecting strut including normally upper and lower telescoping tubular sections and energy absorbing means acting between said tubular sections for yieldably resisting relative longitudinal movement of said tubular sections, upper coupling means on the upper end of said upper tubular section for attaching said upper section to said cantilevered camper body section, lower coupling means on the lower end of said lower tubular section for attaching said lower section to said truck body, each of said couplings comprising a threaded stem on the corresponding tubular section, a thrust shoulder surrounding said stem, a nut threaded on said stem, a mounting bracket having a slot receiving said stem between said shoulder and nut, whereby said nut may be threaded toward said shoulder to clamp said strut to said bracket, and an entrance opening to said slot through which said stem may be removed from and reinserted into said slot without removal of said nut from said stem, and means for securing said bracket to said camper vehicle in such a way as to permit separation of said strut from and reattachment of said strut to said mounting brackets while the latter remain attached to said vehicle, thus to accommodate rapid removal of said strut from and reinstallation of said strut on said vehicle, said mounting bracket of one coupling having a generally U-shape and including an arcuate central section terminating in outwardly directed seating flanges for seating against a mounting surface on said vehicle, whereby said arcuate bracket section is spaced from said surface, and the slot in said latter bracket extending longitudinally of said arcuate bracket section and terminating at one end in an enlarged opening which constitutes said slot entrance opening and being dimensioned to pass the corresponding coupling nut in its axial direction, thereby to permit insertion of the corresponding stem into and removal of the latter stem from said slot.

5. For use on a camper vehicle including a camper body supported on the rear cargo section of a pickup truck and having a forward cantilevered section projecting over the cab of said truck, a combination shock absorbing and stabilizing device to be connected between said cantilevered body section and the truck body, comprising:

a connecting strut including normally upper and lower telescoping tubular sections and energy absorbing means acting between said tubular sections for yieldably resisting relative longitudinal movement of said tubular sections, upper coupling means on the upper end of said upper tubular section for attaching said upper section to said cantilevered camper body section, lower coupling means on the lower end of said lower tubular section for attaching said lower section to said truck body, each of said couplings comprising a threaded stem on the corresponding tubular section, a thrust shoulder surrounding said stem, a nut threaded on said stem, a mounting bracket having a slot receiving said stem between said shoulder and nut, whereby said nut may be threaded toward said shoulder to clamp said strut to said bracket, and an entrance opening to said slot through which said stem may be removed from and reinserted into said slot without removal of said nut from said stem, and means for securing said bracket to said camper vehicle in such a way as to permit separation of said strut from and reattachment of said strut to said mounting brackets while the latter remain attached to said vehicle, thus to accommodate rapid removal of said strut from and reinstallation of said strut on said vehicle, said mounting bracket of said lower coupling having a generally U-shape in transverse section and including a cross plate bounded along two opposite longitudinal edges by depending side flanges terminating in outwardly directed seating flanges for seating against the surface of said truck, whereby said cross plate is spaced from said surface, the stem receiving slot in said latter bracket being formed in said cross plate and extending parallel to said longitudinal plate edges and through a remaining edge of said plate to provide said latter slot with an open end which forms said entrance opening through which the corresponding stem may be laterally inserted into and removed from the slot, said lower coupling further comprising a socket secured to said lower tubular section, and a ball secured to the latter coupling stem and swivelly caged in said socket to provide a swivel connection between the latter stem and tubular section, the mounting bracket of said upper coupling having a generally U-shape and including an arcuate central section terminating in outwardly directed seating flanges for seating against the under surface of said camper body extension, whereby said arcuate bracket section is spaced from said surface, and the slot in said upper bracket extending longitudinally of said arcuate bracket section and terminating at one end in an enlarged opening in said arcuate section which constitutes said slot entrance opening and is dimensioned to pass the upper coupling nut in its axial direction, thereby to permit insertion of the upper coupling stem into and removal of the latter stem from said slot.

6. For use on a camper vehicle including a camper body supported on the rear cargo section of a pickup truck and having a forward cantilevered section projecting over the cab of said truck, a combination shock absorbing and stabilizing device to be connected between said cantilevered body section and the truck body, comprising:

a connecting strut including normally upper and lower telescoping tubular sections and energy absorbing means acting between said tubular sections for yieldably resisting relative longitudinal movement of said tubular sections, upper quick release coupling means on the upper end of said upper tubular section for releasably attaching said upper section to said cantilevered camper body section, lower quick release coupling means on the lower end of said lower tubular section for releasably attaching said lower section to said truck body, and one of said coupling means comprising a ball and socket swivel joint including a first swivel member attached to said strut, a second swivel member having a threaded stem, a thrust shoulder surrounding said stem, a nut threaded on said stem, a mounting bracket having a slot receiving said stem between said shoulder and nut, whereby said nut may be threaded toward said shoulder to clamp said strut to said bracket, and an entrance opening to said slot through which said stem may be removed from and inserted into said slot without removal of said nut from said stem, and means for securing said bracket to said camper vehicle in such a way as to permit separation of said strut from and reattachment of said strut to said mounting bracket while the latter remains attached to said vehicle, thus to accommodate rapid removal of said strut from and reinstallation of said strut on said vehicle.

7. For use on a camper vehicle including a camper body supported on the rear cargo section of a pickup truck and having a forward cantilevered section projecting over the cab of said truck, a combination shock absorbing and stabilizing device to be connected between said cantilevered body section and the truck body, comprising:

a connecting strut including normally upper and lower telescoping tubular sections and energy absorbing means acting between said tubular sections for yieldably resisting relative longitudinal movement of said tubular sections, upper quick release coupling means on the upper end of said upper tubular section for releasably attaching said upper section to said cantilevered camper body section, lower quick release coupling means on the lower end of said lower tubular section for releasably attaching said lower section to said truck body, and one of said couplings comprising a threaded stem on the corresponding tubular section, a thrust shoulder surrounding said stem, a nut threaded on said stem, a mounting bracket having a slot receiving said stem between said shoulder and nut, whereby said nut may be threaded toward said shoulder to clamp said strut to said bracket, said mounting bracket having a generally U-shape and including an arcuate central section terminating in outwardly directed seating flanges for seating against a mounting surface on said vehicle, whereby said arcuate bracket section is spaced from said surface, said slot extending longitudinally of said arcuate bracket section and terminating at one end in an enlarged opening which constitutes a slot entrance opening which is dimensioned to pass said coupling nut in its axial direction, thereby to permit insertion of said stem into and removal of said stem from said slot.

References Cited

UNITED STATES PATENTS 3,347,590  10/1967  Bowen.
1,966,700   7/1934  Armstrong _____ 287—20

PHILIP GOODMAN, *Primary Examiner.*